Dec. 10, 1968     H. W. NELSON     3,415,595

PRESCRIPTION LENSES FOR WELDER'S HELMET AND THE LIKE

Filed Jan. 21, 1965

INVENTOR.
HARRY W. NELSON
BY
    Oldham & Oldham
                  ATTYS.

United States Patent Office 3,415,595
Patented Dec. 10, 1968

3,415,595
PRESCRIPTION LENSES FOR WELDER'S
HELMET AND THE LIKE
Harry W. Nelson, 1669 Riverside Drive,
Akron, Ohio 44310
Filed Jan. 21, 1965, Ser. No. 426,881
1 Claim. (Cl. 351—44)

ABSTRACT OF THE DISCLOSURE

A construction for a welder's helmet in which prescription lenses are removably mounted by a bayonet joint means in a firmly fitting insulated relation within the helmet in the proper position and spaced from ordinary protective glass or plastic located on both sides of the lenses.

---

This invention relates to mechanism for mounting prescription lenses in a welder's helmet, in safety goggles, and the like.

It has been proposed heretofore to mount magnifying glasses or lenses in a welder's helmet, and even prescription lenses in a welder's helmet, but such known constructions have been open to the objection that the constructions are expensive, require special lenses not available from the ordinary optometrist, and are not adapted to the substitution of new prescription lenses as required by changes in the eye conditions of the wearer.

It has likewise been proposed heretofore to provide prescription lenses for safety or welder's goggles, but most known constructions have been open to one or more of the objections stated in the preceding paragraph. Many of these objections have been overcome by the prescription lens construction disclosed and claimed in U.S. Patent No. 3,147,489 which utilizes a plastic ring mounting a fully circular prescription lens which can be readily obtained by the wearer at low cost from any local optometrist in the prescription required by the wearer but in a standard round size, for example, 45 mm.

It is the general object of the present invention to avoid and overcome the difficulties of and objections to the prior art by the provision of an improved, relatively inexpensive, sturdy and long wearing arrangement of prescription lenses for use in welder's helmets, safety goggles, and the like.

Another object of the invention is the provision of a construction of the character described in which the prescription lenses can be obtained from any local optometrist, and which can be quickly and easily installed or changed from time to time without requiring special tools, cements, or skill.

Another object of the present invention is the provision of prescription lenses for welder's helmets and the like which lenses can be interchanged with lenses of the welder's goggles described and claimed in U.S. Patent No. 3,147,489.

The foregoing objects of the invention, and other objects which will become apparent as the description proceeds, are achieved by providing the combination in a welder's helmet, or the like, of an open rectangular frame of a size to provide a window opening through which a wearer can look, a rectangular piece of protective transparent glass positioned in the frame to the front thereof, a rectangular piece of filter glass positioned in the frame against the protective glass, a rectangular block of plastic having about twice the thickness of a prescription lens and positioned in the frame against the filter glass, said plastic block having two cylindrical eyeholes therein, a plastic ring positioned in each eyehole, a prescription lens of standard round size carried by each plastic ring in a groove therein, bayonet joint means releasably securing each ring in each eyehole, a rectangular piece of protective transparent glass positioned in the frame against the plastic block, and means engaging with the edges of last-named glass for holding the various parts in the frame.

For a better understanding of the invention reference should be had to the accompanying drawings wherein.

Figure 1:
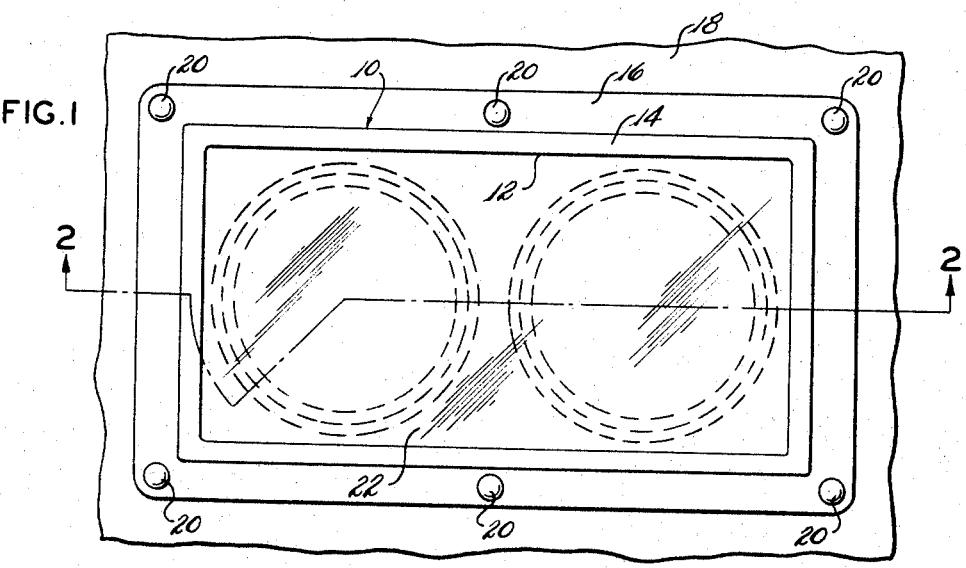
FIGURE 1 is a front elevation, of the present invention applied to a welder's helmet which is largely broken away.

Referring to the drawings in detail, the numeral 10 indicates generally an open rectangular frame preferably made of sheet metal, but which also could be molded from tough, strong plastic. The frame 10 has a window opening 12 defined by a right angle flange 14 on the frame. The frame 10 also has a diagonally directed flange 16 which can be secured to a welder's helmet 18 as by rivets 20.

Figure 2:
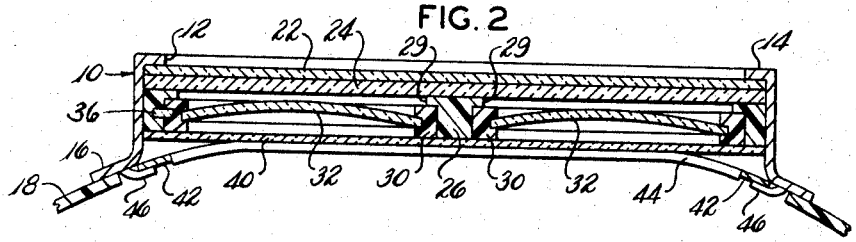
FIGURE 2 is a longitudinal cross sectional view taken substantially on line 2—2 of FIGURE 1.

Removably received in the open frame 10 is a rectangular piece of protective transparent glass 22 which as best seen in FIGURE 2 of the drawings, butts against the flange 14. This glass protects the assembly against any splashes of welding metal, or flying particles, and in the event of damage to or marring of this glass it can be readily replaced at low cost. The glass 22 can be made tempered to strongly resist the blow of any flying particle, can even be made laminated, or could be made of transparent plastic so as to provide definite safety characteristics, as will be understood. Hence, the term "glass" as used throughout the specification and claims is intended to include both glass and plastic.

Positioned behind the glass 22 is a rectangular piece of filter glass 24 of the proper or desired filter strength to protect the eyes of the wearer against any specific welding operation. If the mechanism of the invention is to be utilized only as safety goggles, in a grinding operation, for example, the filter glass 24 may be omitted from the assembly.

Figure 3:
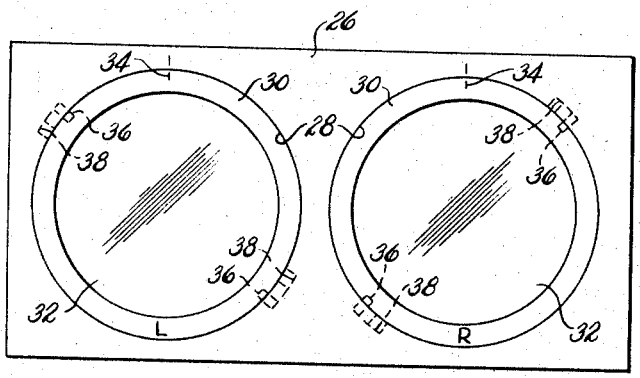
FIGURE 3 is a rear elevation of the plastic block removably supporting the prescription lenses and incorporated in the construction.

Positioned behind the filter glass 24 in the frame 10 is a rectangular block of plastic 26, best seen in FIGURE 3, and having about twice the thickness of a prescription lens. The plastic block 26 has two cylindrical eyeholes 28 provided therethrough with a circular flange 29 at one end of each eyehole, and removably positioned in each eyehole and fitting against the flange 29 is a plastic ring 30 having a vertical height, i.e. thickness, equal to that of the plastic block 26 minus the thickness of the flange 29. Each plastic ring 30 is provided with a central endless circular groove in which is received the edge of a prescription lens 32 of a standard round size, for example, 45 mm.

The apparatus of the invention is sold including the plastic rings 30 and all of the remaining parts previously described, but not including the prescription lens 32. The prescription lens or lenses 32 of standard round size can be obtained from the local optometrist in the exact prescription of the wearer for each eye, and the wearer gives the optometrist the plastic rings 30 who softens these rings with heat and mounts the prescription lens in each, all in accord with known techniques. One plastic ring 30 is marked L for left eye and the other is marked R for right eye, and each ring includes an alignment mark 34 for aligning with a mark on the plastic block 26 so that the rings are angularly positioned in a correct manner in the mounting block 26.

The plastic rings 30 with the prescription lenses 32 therein are removably mounted in the cylindrical eyeholes 28 of the plastic block 26, and this is conveniently achieved by the provision of diametrically opposed pins 36 in each ring 30 which are removably received in bayonet joint slots 38 in the block 26. In this manner the plastic rings 30 can each be stabbed into its cylindrical eyehole 28 and rotated to lock the plastic rings and prescription lenses into the plastic block 26 with the angular indicia 34 being brought into register.

Should it ever become necessary to change one or more of the prescription lenses as the eye conditions of the wearer of the apparatus change, it is a quick and simple matter to remove each plastic ring 30 from the plastic block 26, return the rings 30 and lenses 32 to the optometrist and have him substitute new round lenses 32 for those in the plastic rings. Also, should the wearer of the apparatus wish to remove the prescription lenses 32 from the plastic block 26 to utilize these lenses in the goggles of U.S. Patent No. 3,147,489, again, it is a simple matter to remove the plastic rings 30 and the associated lenses 32 from the plastic block 26 and to utilize the plastic rings and prescription lenses in the goggles of said patent.

Positioned over the back of the plastic block 26 is a rectangular piece of protective transparent glass 40 which may be similar to the glass 22, performing the function of protecting the prescription lenses 32, and with the glass 40 being replaceable.

Holding the assembly of the parts previously described in position in the frame 10 are suitable means which in the form of the invention illustrated comprise a rectangular O-shaped piece 42 of spring metal having a large opening 44 in its center, the ends of the spring metal being releasably engaged with clips 46 struck down from the frame 10. The arrangement is such that the spring metal 42 engages the assembly and specifically the glass 40 only at the lateral edges thereof leaving the center of the assembly completely open to look through.

It is a simple matter to spring out the spring member 42 so that any of the assembly can be removed to be replaced, cleaned, or the like, followed by reassembly and reinsertion of the spring locking means 42.

The invention has been particularly described in conjunction with a welder's helmet. However it is to be particularly understood that the combination described can be readily adapted to provide a pair of goggles wherein the frame 10 is adapted to be secured over the eyes of the wearer by means of support straps. In this event the diagonal flange 16 is provided with, usually, some cushioning means between the flange and the face of the wearer. In addition, the frame 10 may be constructed to have an offset portion at the center bottom which fits over the nose of the wearer.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a welder's helmet of an open rectangular frame of a size to provide a window opening through which a wearer can look, a rectangular piece of protective transparent glass positioned in the frame to the front thereof, a rectangular piece of filter glass positioned in the frame against the protective glass, a rectangular block of plastic having about twice the thickness of a prescription lens and positioned in the frame against the filter glass, said plastic block having two recessed cylindrical eyeholes therein, a plastic ring positioned in each eyehole, a prescription lens of standard round 45 mm. size carried by each plastic ring in a groove therein, diametrically opposed pins mounted on the periphery of each ring and mating bayonet slots located in each eyehole of the block for releasably securing each ring in each eyehole whereby the exposed rear surface of the ring is flush with the rear surface of the plastic block and the surfaces of the lenses are spaced within the plane of the surfaces of the plastic block, a rectangular piece of protective transparent glass positioned in the frame against the plastic block, and means engaging with the edges of last-named glass for holding the various parts in the frame.

References Cited

UNITED STATES PATENTS

| | | | |
|---|---|---|---|
| 1,565,890 | 12/1925 | Baker | 2—14 |
| 1,905,210 | 4/1933 | Bowers | 2—8 |
| 1,989,876 | 2/1935 | Meyrowitz | 2—14.13 |
| 2,263,116 | 11/1941 | Andrews | 2—8 |
| 2,427,918 | 9/1947 | Malcom et al. | 2—14.4 |
| 2,628,530 | 2/1953 | Rabben | 351—44 |

DAVID SCHONBERG, *Primary Examiner.*

W. L. BROWN, *Assistant Examiner.*

U.S. Cl. X.R.

351—158; 2—8, 14